(12) United States Patent
Dominique et al.

(10) Patent No.: US 12,330,485 B2
(45) Date of Patent: Jun. 17, 2025

(54) APPARATUS FOR MOVING A LOWER LID OF A SPLIT TAILGATE IN A CAR

(71) Applicant: Volvo Car Corporation, Gothenburg (SE)

(72) Inventors: Christer Dominique, Gothenburg (SE); Ebrahim Shakil, Gothenburg (SE); Gerardo Morales, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 296 days.

(21) Appl. No.: 17/959,348

(22) Filed: Oct. 4, 2022

(65) Prior Publication Data

US 2023/0110112 A1    Apr. 13, 2023

(51) Int. Cl.
*B60J 5/10* (2006.01)
*E05F 15/627* (2015.01)

(52) U.S. Cl.
CPC ............. *B60J 5/103* (2013.01); *E05F 15/627* (2015.01); *E05Y 2201/654* (2013.01); *E05Y 2900/532* (2013.01)

(58) Field of Classification Search
CPC ....... B60J 5/103; E05F 15/627; E05F 15/616; E05Y 2201/654; E05Y 2900/532; E05Y 2201/622; E05Y 2900/544
USPC ...................................................... 296/57.1
See application file for complete search history.

(56) References Cited

U.S. PATENT DOCUMENTS

| 7,401,832 | B2* | 7/2008 | Yui | E05D 5/062 296/57.1 |
| 2005/0121940 | A1* | 6/2005 | Kleinmann | E05F 15/63 296/146.4 |
| 2007/0132264 | A1 | 6/2007 | Koneval et al. | |
| 2015/0217631 | A1* | 8/2015 | Warburton | E05F 15/63 49/358 |
| 2017/0298674 | A1 | 10/2017 | Marco | |

FOREIGN PATENT DOCUMENTS

EP    1520952 A1    4/2005

OTHER PUBLICATIONS

Mar. 25, 2022 European Search Report issued in International Application No. 21201496.

\* cited by examiner

*Primary Examiner* — Joseph D. Pape
(74) *Attorney, Agent, or Firm* — Clements Bernard Walker; Christopher L. Bernard

(57) ABSTRACT

An apparatus for moving a lower lid of a split tailgate in a car, including: a Bowden cable; a drive unit configured to drive the Bowden cable; and a mechanical interface configured to be connected with an end portion of the Bowden cable and with the lower lid of the split tailgate of the car; the mechanical interface including a structural element configured to be connected with a hinge of the lower lid of the split tailgate.

14 Claims, 2 Drawing Sheets

APPARATUS FOR MOVING A LOWER LID OF A SPLIT TAILGATE IN A CAR

CROSS-REFERENCE TO RELATED APPLICATION

The present disclosure claims the benefit of priority of co-pending European Patent Application No. 21 201 496.3, filed on Oct. 7, 2021, and entitled "APPARATUS FOR MOVING A LOWER LID OF A SPLIT TAILGATE IN A CAR," the contents of which are incorporated in full by reference herein.

TECHNICAL FIELD

The present disclosure relates to an apparatus for moving a lower lid of a split tailgate in a car, to a system for moving a lower lid of a split tailgate in car, to a use of a Bowden cable in such an apparatus and to a use of a drive unit in such an apparatus.

BACKGROUND

Various automatic closure and opening mechanisms for a tailgate of a car are known. For example, such automatic mechanisms include pneumatic drives and mechanical systems configured to open and close a tailgate after receiving a control signal sent from a user. A special application are split tailgates of car. Split tailgates include a lower lid and an upper lid.

In view of this, it is found that a further need exists to provide an improved possibility to move a lower lid of a split tailgate.

SUMMARY

In the view of the above, it is an object of the present disclosure to provide an improved possibility for moving a lower lid in a split tailgate in a car.

This and other objects, which become apparent upon reading the following description, are solved by the subject matter of the present disclosure.

According to a first aspect, an apparatus for moving a lower lid of a split tailgate in a car is provided, including: a Bowden cable; a drive unit configured to drive the Bowden cable; a mechanical interface configured to be connected with an end portion of the Bowden cable and with the lower lid of the split tailgate of the car; the mechanical interface including a structural element configured to be connected with a hinge of the lower lid of the split tailgate. The term lower lid, as used herein, is to be understood broadly and relates in particular to a mechanical lower lid configured to be opened and closed. The split tailgate, as used herein, is to be understood broadly and relates in particular to a split tailgate including a lower lid and an upper lid. The term car, as used herein, is to be understood broadly and relates in particular to a passenger car. The term Bowden cable, as used herein, is to be understood broadly and relates in particular to a mechanical cable configured to move a structural element between two or more positions. The term drive unit, as used herein, is to be understood broadly and relates in particular to a drive unit configured to drive a Bowden cable. The drive unit may be one of the following an electro mechanical drive unit, a pneumatic drive unit, a hydraulic drive unit. The term mechanical interface, as used herein, is to be understood broadly and relates in particular to an interface configured to provide a connection between an end of a Bowden cable and a lower lid of a split tailgate respectively a hinge of lower lid. The mechanical interface may include one or more structural elements. The term structural element, as used herein, is to be understood broadly and relates to a mechanical element configured to transmit a force respectively a movement. The term hinge, as used herein, is to be understood broadly and relates in particular to a hinge configured to provide a pivoting movement of a lower lid of a split tailgate relative the car. The lower lid may include one or more hinges.

In other words, the present disclosure provides an apparatus for a gentle moving of a lower lid of a split tailgate as the force or movement is indirectly introduced in the lower lid via the mechanical interface connected to the hinge and to the Bowden cable. This may allow designing the lower lid of the split tailgate without any mechanical reinforcements. The use of the Bowden cable may allow positioning the drive unit in an arbitrary position to the lower lid of the split tailgate as the Bowden cable provides a flexible and space saving connection between the drive unit and the lower lid respectively between drive unit and the mechanical interface connected to the hinge of the lower lid. By moving the hinge of the lower lid, also the lid moves accordingly. This may enable a lower weight as no weight added to the lid itself. This may enable a higher flexibility in terms of packaging. This may enable no reinforced structure of the movable part as forces are kept within the hinge.

In an implementation, the structural element may be configured to be connected rigidly with a rod of the hinge or with a bracket of the hinge. The hinge may include a rod and one or more brackets. The lower lid of the split tailgate may be connected rigidly with a bracket of a hinge or may be connected rigidly with a rod of a hinge. By connecting the structural element rigidly with the bracket or with the rod, a movement of the rod or bracket leads to a movement of the lower lid of the split tailgate. This may allow an indirect introduction of a force respectively a movement in the lower lid of the split tailgate of the car.

In an implementation, the hinge of the lower lid of the split tailgate of the car may include a rod and a bracket, and the rod may be connected rigidly via the hinge with the lower lid of the lower split tailgate.

In an implementation, the Bowden cable may drive the structural element. The Bowden cable may be connected rigidly with the structural element. The connection may include a load carrying connection (e.g. screw connection, clamp connection), a substance-to-substance bond (e.g. welding).

In an implementation, the structural element may include a lever. The lever may be rigidly connected to the hinge and to the Bowden cable. The lever may transmit force and movement. The lever may be a metal lever. The lever may include a through hole for being connected with the Bowden cable. The lever may be welded to the hinge, in particular to a bracket or a rod of the hinge.

In an implementation, the structural element may include further a bell-crank connected to the lever. The term bell-crank is to be understood broadly and relates in particular to a structural element configured to transmit a movement of the Bowden cable into a pressure to the lever. The bell-crank may enable an increase of the torque by a constant force of the drive unit respectively the Bowden cable. The bell-crank may allow a use of a less powerful drive unit.

In an implementation, the mechanical interface may include a frame structure configured to be connected rigidly with the car. The term frame structure is to be understood broadly and relates in particular to a frame or structure configured to be connected with the car and with a hollow outer cable of the Bowden cable. The frame structure may be a single element or include a plurality of elements. The frame structure may be connected with the hinge or in the area of the hinge. The frame structure may prevent a transmission of stress into the lower lid of the split tailgate.

In an implementation, the Bowden cable may include an inner cable rigidly connected with the structural element and a hollow outer cable housing rigidly connected with the frame structure of the mechanical interface.

In an implementation, the drive unit may be an electro-mechanical drive unit.

In an implementation, the drive unit may be configured to be arranged freely in a body structure of the car. The freely arrangement of the drive unit in combination with the Bowden cable may increase the design flexibility of the opening and closing mechanism. Preferably, the drive unit is arranged in the frunk of the car.

In an implementation, the drive unit may be configured to drive the Bowden cable from a first position to a second position and/or from the second position to the first position.

A further aspect of the present disclosure relates to a system for moving a lower lid of a split tailgate in a car, including: an apparatus as described above; a lower lid; a hinge arranged to connect the lower lid of the car, the hinge being configured to allow a rotational movement of the lower lid relative to the car.

In an implementation, the system may further include a car.

A further aspect of the present disclosure relates to a use of a Bowden cable in an apparatus as described above.

A last aspect of the present disclosure relates to a use of a drive unit in an apparatus.

BRIEF DESCRIPTION OF THE DRAWINGS

In the following, the disclosure is described exemplarily with reference to the enclosed figure, in which.

Notably, the figures are merely schematic representations and serve only to illustrate an embodiment of the present disclosure. Identical or equivalent elements are in principle provided with the same reference signs.

DESCRIPTION OF EMBODIMENTS

Figure 1:
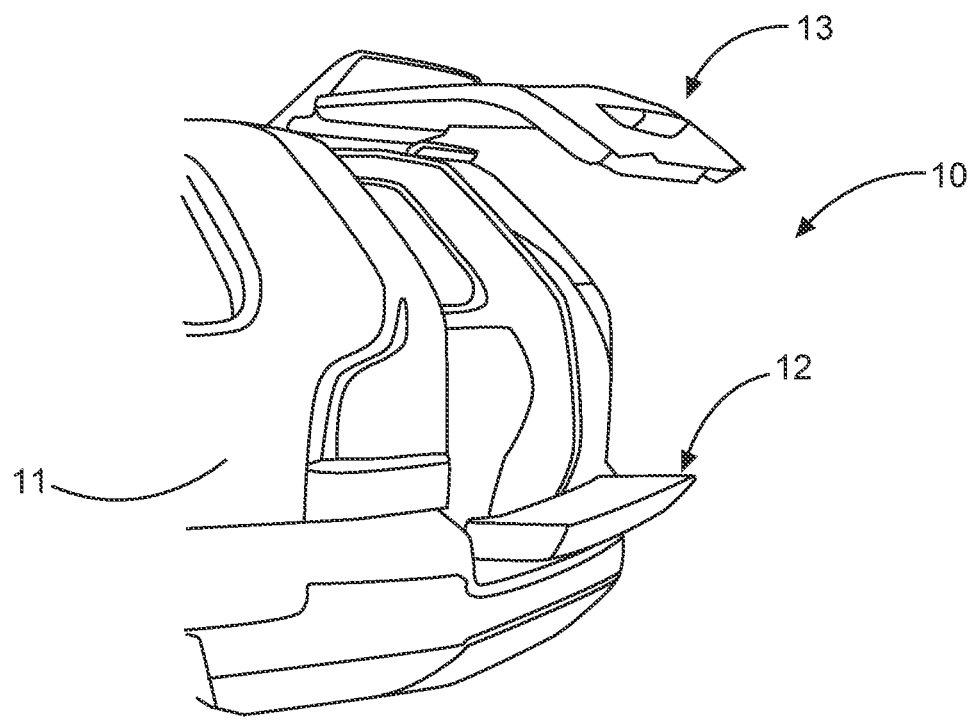
FIG. 1 is a schematic view of a split tailgate of car.

FIG. 1 shows a schematic view of a split tailgate 10 of a car 11. The split tailgate 10 includes a lower lid 12 and an upper lid 13. The lower lid 12 and the upper lid 13 are respectively in an opened position.

Figure 2:
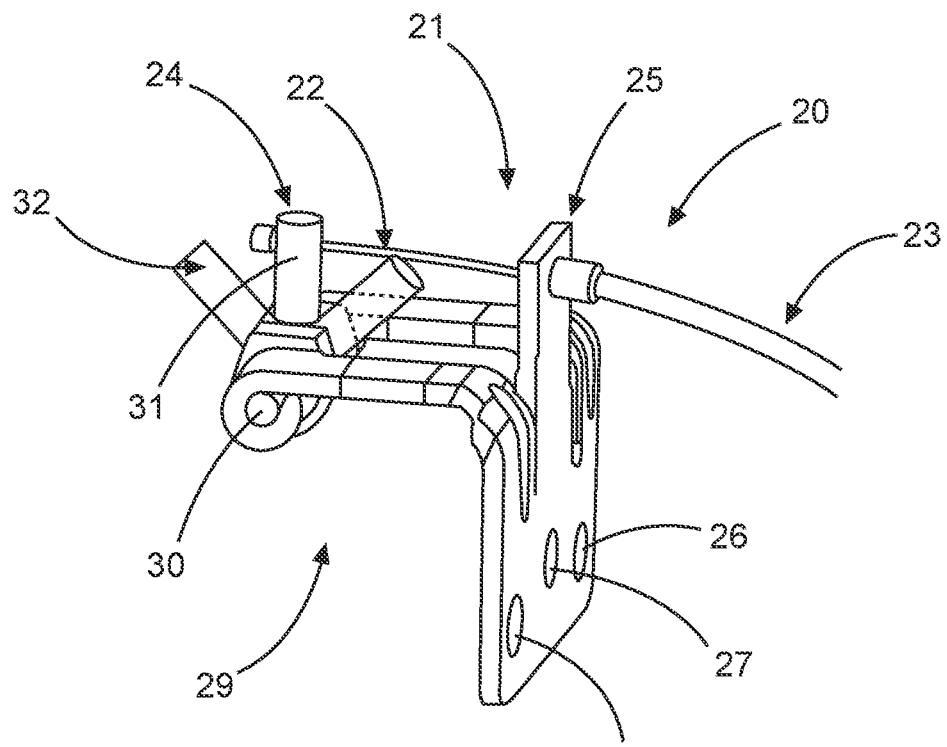
FIG. 2 is a schematic view of an apparatus for moving a lower lid of a split tailgate in car according to an embodiment of the present disclosure.

FIG. 2 shows a schematic view of an apparatus 20 of for moving a lower lid of a split tailgate in car according to an embodiment of the present disclosure. The apparatus 20 includes a Bowden cable 21. The apparatus includes a mechanical interface 29 configured to be connected with an end of the Bowden cable 21 and with the lower lid of the split tailgate. The mechanical interface 29 includes a structural element 24, in the present example a lever configured to be connected with a hinge of the lower lid of the split tailgate. The apparatus includes further a drive unit (see FIG. 3) configured to drive the Bowden cable 21. The Bowden cable 21 includes an inner cable 22 rigidly connected with a structural element 24. The Bowden cable 21 includes further a hollow outer cable housing 23 rigidly connected with a frame structure 25 of the mechanical interface 29. The structural element 24 is in the present example connected rigidly to a rod 30 of the hinge of the lower lid of the split tailgate. The rod 30 is connected in the present example by a hinge bracket (not shown) to the lower lid of the split tailgate (not shown). The Bowden cable 21 drives the structural element 24 and thereby the rod 30 respectively the lower lid of the split tailgate (not shown). The mechanical interface 29 includes in the present example a frame structure 25 configured to be connected rigidly with the car. The connection may be carried out by a screw connection via the through holes 26, 27 and 28. The drive unit may be configured to drive the Bowden cable 21 from a first position 31 to second position 32, the first position being indicative for a closed state of the split tailgate and the second position for an opened state of the split tailgate. The drive unit may be in the present example an electro mechanical drive unit. The drive unit may be configured to be arranged freely in a body structure of the car. The structural element may further include a bell-crank connected to the lever 24. The frame structure 25 may also serve as one bracket of a hinge of the lower lid of the split tailgate. It should be noticed that the apparatus as described above might also be implemented as retrofit set.

Figure 3:
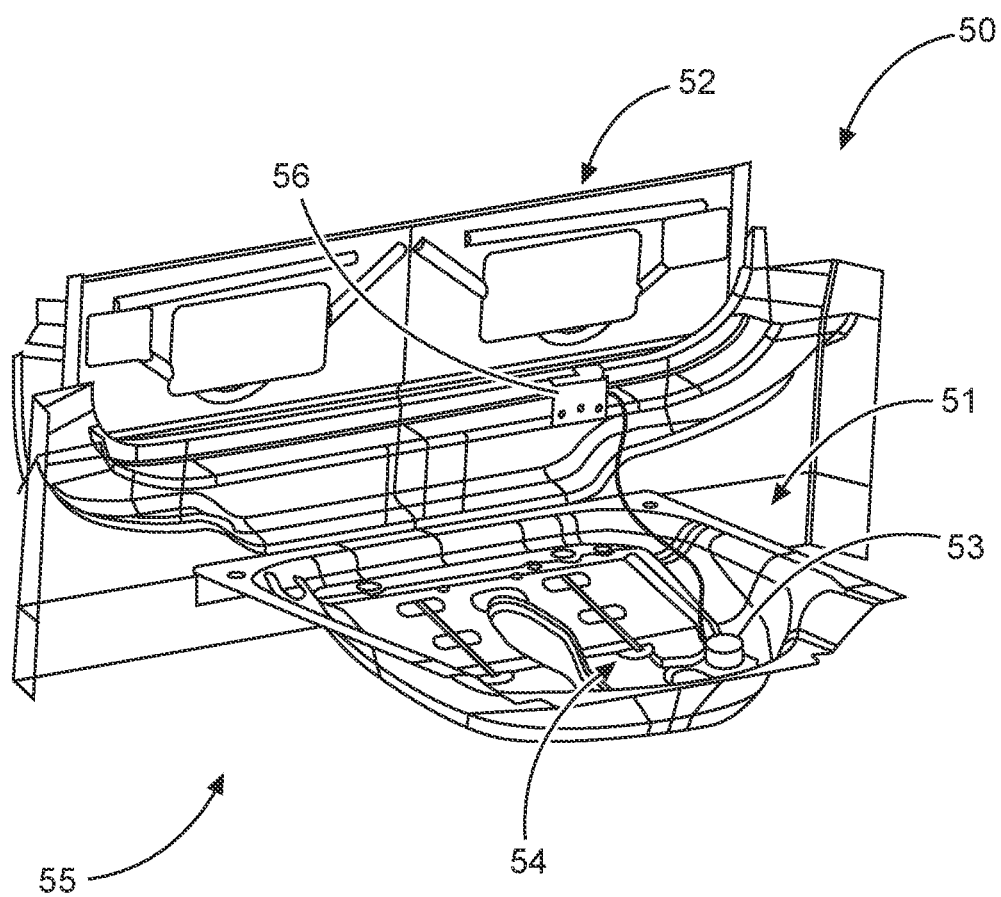
FIG. 3 is a schematic view of a system for moving a lower lid of a car according to an embodiment of the present disclosure.

FIG. 3 shows a schematic view of a system 50 for moving a lower lid 52 of a car 55 according to an embodiment of the present disclosure. The system 50 includes an apparatus 51 as described in FIG. 2 and a lower lid 52 with a hinge of a split tailgate. The system 50 may further include a car 55 with a split tailgate. The drive unit 53 of the apparatus 51 is arranged freely in the body structure 54 of the car 55. The mechanical interface 56 is arranged in the vicinity of the hinge of the lower lid of the split tailgate. The mechanical interface 56 is screwed to a structural part of the car, in the present example a cross member rear. The drive unit provides the force required to maneuver the lower lid of the split tailgate from a closed position to an opened position or vice versa. The working principle is that the drive unit controls the Bowden cable connected via the mechanical interface to the lower lid of the split tailgate. The Bowden cable is attached to the lever, which is part of the mechanical interface. The lever is fitted into the movable part of the hinge (e.g. rod or bracket). The lever may be fitted into another device of the lower lid of the split tailgate. Another device may be supports fitted to the lower lid on left and right hand side of the car, supporting the lower lid from falling down when opened, pushing it outwards during opening and helping lifting it during closing.

Other variations to the disclosed embodiment can be understood and effected by those skilled in the art in practicing the claimed subject matter, from the study of the drawings, the disclosure, and the appended claims. In particular, respective parts/functions of the respective embodiments described above may also be combined with each other. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. An apparatus for moving a lower lid of a split tailgate in a car, the apparatus comprising:
   a Bowden cable;
   a drive unit configured to drive the Bowden cable; and
   a mechanical interface configured to be connected with an end portion of the Bowden cable and with the lower lid of the split tailgate of the car;
   the mechanical interface comprising a structural element configured to be connected with a hinge of the lower lid of the split tailgate, wherein the connection of the mechanical interface to the lower lid of the split tailgate is indirectly, through the connection of the structural element to a rod or a bracket of the hinge of the lower lid.

2. The apparatus according to claim 1, the structural element being configured to be connected rigidly with a rod of the hinge or with a bracket of the hinge.

3. The apparatus according to claim 1,
   the hinge of the lower lid of the split tailgate of the car comprising a rod and a bracket,
   the rod being connected rigidly via the hinge with the lower lid of the split tailgate.

4. The apparatus according to claim 1, the Bowden cable driving the structural element.

5. The apparatus according to claim 1, the structural element comprising a lever.

6. The apparatus according to claim 5, the structural element comprising further a bell-crank connected to the lever.

7. The apparatus according to claim 1, the mechanical interface comprising a frame structure configured to be connected rigidly with the car.

8. The apparatus according to claim 1, the Bowden cable comprising an inner cable rigidly connected with the structural element and a hollow outer cable housing rigidly connected with the frame structure of the mechanical interface.

9. The apparatus according to claim 1, the drive unit being an electromechanical drive unit.

10. The apparatus according to claim 1, the drive unit being configured to be arranged freely in a body structure of the car.

11. The apparatus according to claim 1, the drive unit being configured to drive the Bowden cable from a first position to a second position and/or from the second position to the first position.

12. A system for moving a lower lid of a split tailgate in a car, the system comprising:
   a lower lid;
   a hinge arranged to connect the lower lid of the car, the hinge being configured to allow a rotational movement of the lower lid relative to the car; and
   an apparatus, comprising:
      a Bowden cable;
      a drive unit configured to drive the Bowden cable; and
      a mechanical interface configured to be connected with an end portion of the Bowden cable and with the lower lid of the split tailgate of the car;
      the mechanical interface comprising a structural element configured to be connected with the hinge of the lower lid of the split tailgate, wherein the connection of the mechanical interface to the lower lid of the split tailgate is indirectly, through the connection of the structural element to a rod or a bracket of the hinge of the lower lid.

13. The apparatus according to claim 1, wherein the hinge comprises the rod configured to allow rotation of the lower lid of the split tailgate relative to the car, and wherein the structural element is rigidly connected to each of the rod of the hinge and the end of the Bowden cable and operably coupled with the lower lid of the split tailgate such that the lower lid rotates with the rod.

14. An apparatus for moving a lower lid of a split tailgate in a car, the apparatus comprising:
   a Bowden cable;
   a drive unit configured to drive the Bowden cable;
   a mechanical interface configured to be connected with an end portion of the Bowden cable and with the lower lid of the split tailgate of the car;
   the mechanical interface comprising a structural element configured to be connected with a hinge of the lower lid of the split tailgate, and
   the apparatus moving the lower lid of the split tailgate from a single point of contact.

* * * * *